July 12, 1960

C. W. SKARSTROM 2,944,627

METHOD AND APPARATUS FOR FRACTIONATING
GASEOUS MIXTURES BY ADSORPTION

Filed Feb. 12, 1958

Charles W. Skarstrom   Inventor

By A. Abraham  Attorney

July 12, 1960  C. W. SKARSTROM  2,944,627
METHOD AND APPARATUS FOR FRACTIONATING
GASEOUS MIXTURES BY ADSORPTION
Filed Feb. 12, 1958  9 Sheets-Sheet 3

Charles W. Skarstrom  Inventor
By A. Abraham  Attorney

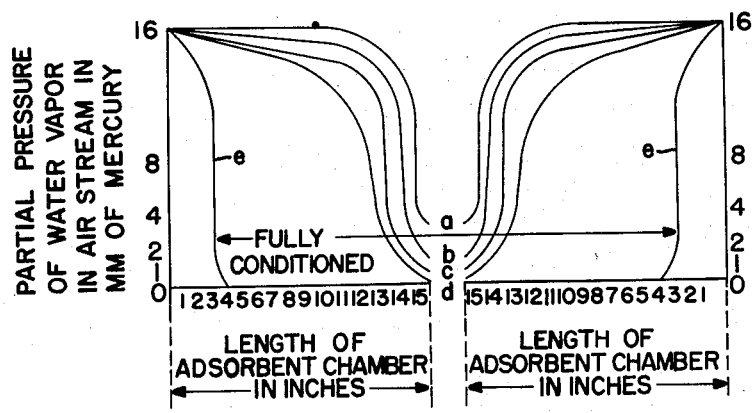

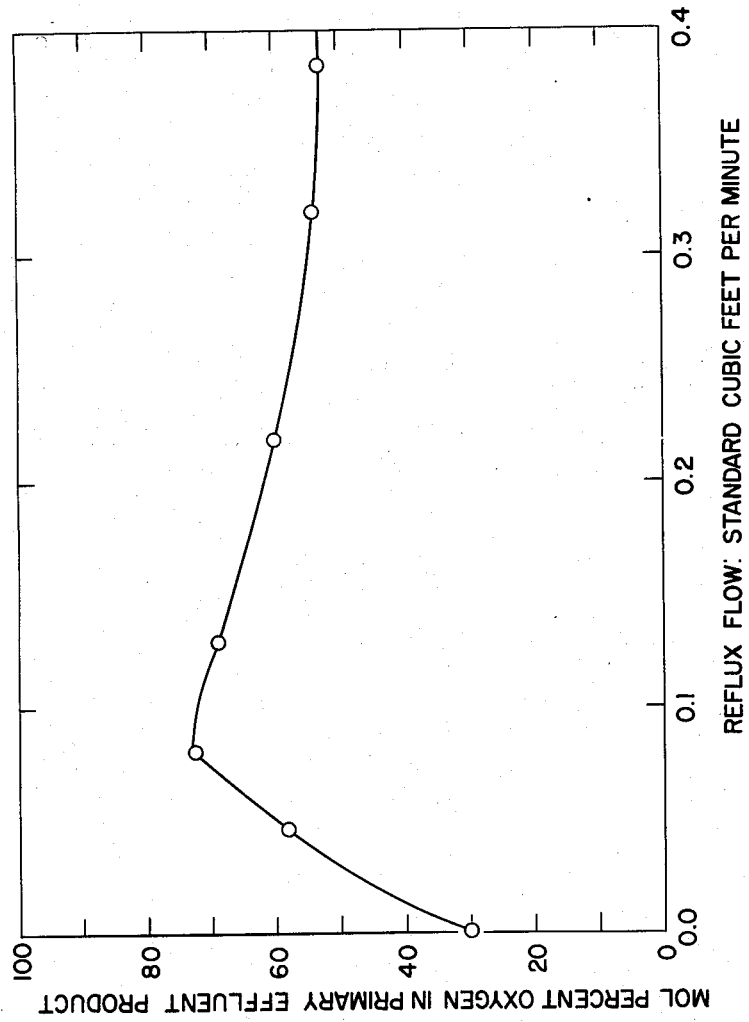

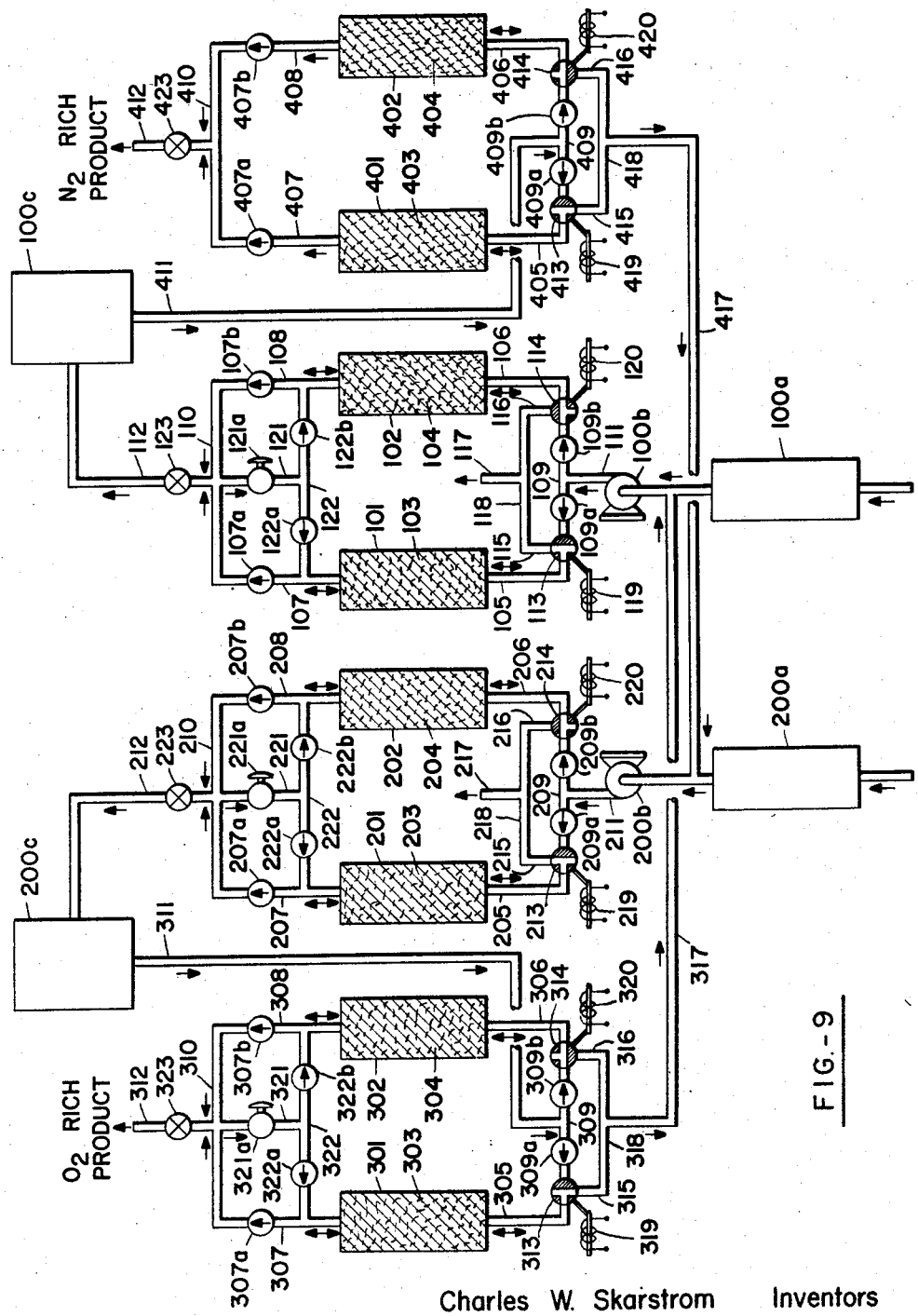

United States Patent Office 2,944,627
Patented July 12, 1960

2,944,627

METHOD AND APPARATUS FOR FRACTIONATING GASEOUS MIXTURES BY ADSORPTION

Charles W. Skarstrom, Montvale, N.J., assignor to Esso Research and Engineering Company, a corporation of Delaware Filed Feb. 12, 1958, Ser. No. 714,780

36 Claims. (Cl. 183—4.7)

This invention relates to a method and apparatus for fractionating gaseous mixtures. The invention relates, more particularly, to a method and apparatus for removing one or more key components from a gaseous mixture or gas stream containing such components. The invention further relates to such a method and apparatus as employed for the separation from a gaseous mixture of one or more component contaminants. The invention also relates to a method and apparatus employed for the purpose of producing an efficient product wherein by removal of one or more components of the original mixture, the percentage concentration of more desirable components is increased in the resulting product. One specific adaptation of the invention relates to the drying of a gaseous mixture, such as air, by removal of water vapor. Also with specific reference, the invention relates to a method and apparatus whereby nitrogen is removed from a stream of atmospheric air to increase the concentration of oxygen in the effluent product stream. In addition, the invention relates to a method and apparatus whereby oxygen is removed from a stream of atmospheric air to increase the concentration of nitrogen in the effluent product stream. In this connection, the invention particularly relates to a combined system for separating air into its major components of oxygen and nitrogen, employing the fractionation method and apparatus herein disclosed.

The present application is a continuation-in-part of an application Serial No. 670,342, filed in the United States Patent Office under date of July 5, 1957, now abandoned.

In various industrial processes, moisture-free or oxygen- or nitrogen-rich air streams are essential to proper operating procedures. Many methods and a variation of apparatus combinations are known or have been proposed to obtain such ends. Most involve either complicated procedures or equipment expensive to assemble and operate. It is an object of the present invention to provide a simple method and apparatus which, with minor modification, may be employed in a multitude of situations where the purification or concentration of gaseous mixtures is desired. Specifically, the objects of the present invention may be stated as follows:

(1) To provide a separation system such as an adsorption system or diffusion system for the drying of air or other gaseous materials, without need for employment of extraneous heat to restore the adsorbent used in the system.

(2) To provide such a system, wherein relatively small amounts of adsorbent material are required for efficient operation, and therefore, wherein expenditures for equipment are considerably reduced.

(3) To provide a method and apparatus whereby oxygen and/or nitrogen-rich products may be recovered from atmospheric air without liquefaction or other expensive or complicated procedures.

(4) To provide a method and apparatus whereby a gaseous mixture may be fractionated to provide a series of effluent product streams in which each such effluent stream is rich in at least one component portion of the gas mixture supplied to the system as a feed material.

The terms "gas" and "gaseous" as employed in the following description or claims are intended to include not only materials that are conventionally considered to be gases, but also those materials conventionally considered to be vapors. Also, the term "key component" as employed in the following description or claims is used to designate the component or components selectively adsorbed from a stream of a gaseous material initially fed to the system.

The invention and its objects may be more fully understood from the following description when it is read in conjunction with, and with refreence to the accompanying drawings in which.

Figure 2:
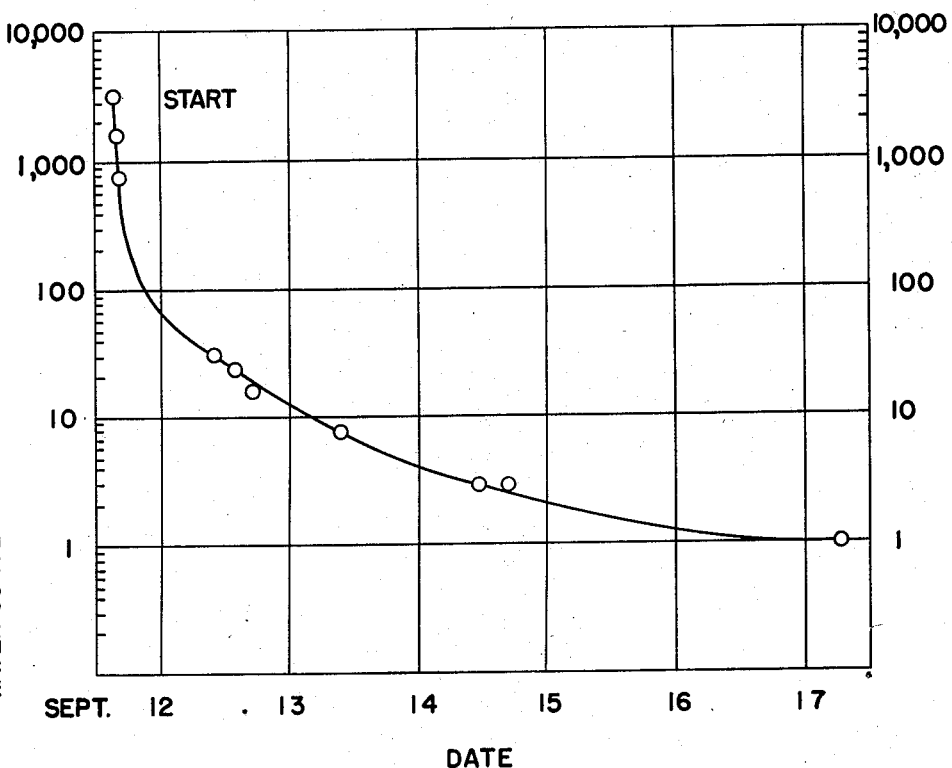
Fig. 2 illustrates graphically an operation in which a system according to the present invention was employed to remove moisture from atmospheric air, and showing progressive conditioning of such a system to produce a substantially constant output of air dried from an initial moisture content of 4000 mol parts per million to approximately 1 mol part per million.
Figure 3:
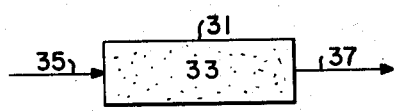
Figure 3A:
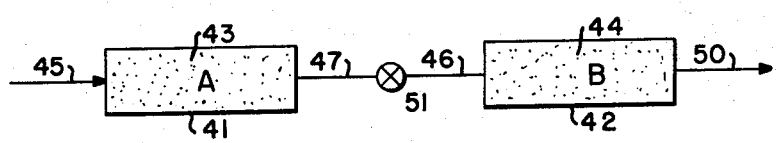
Figure 3B:
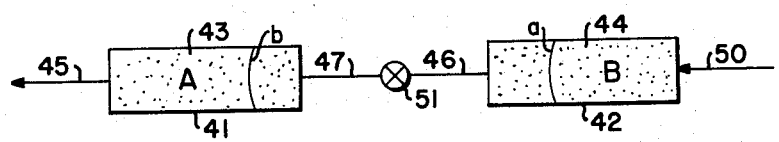
Figure 3C:
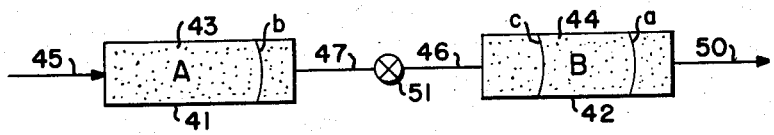
Figure 3D:
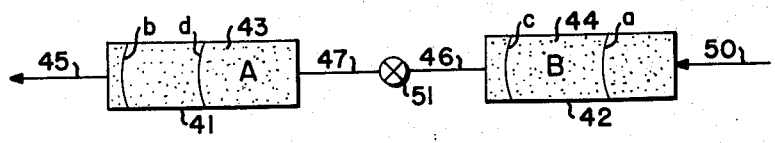
Figure 6:
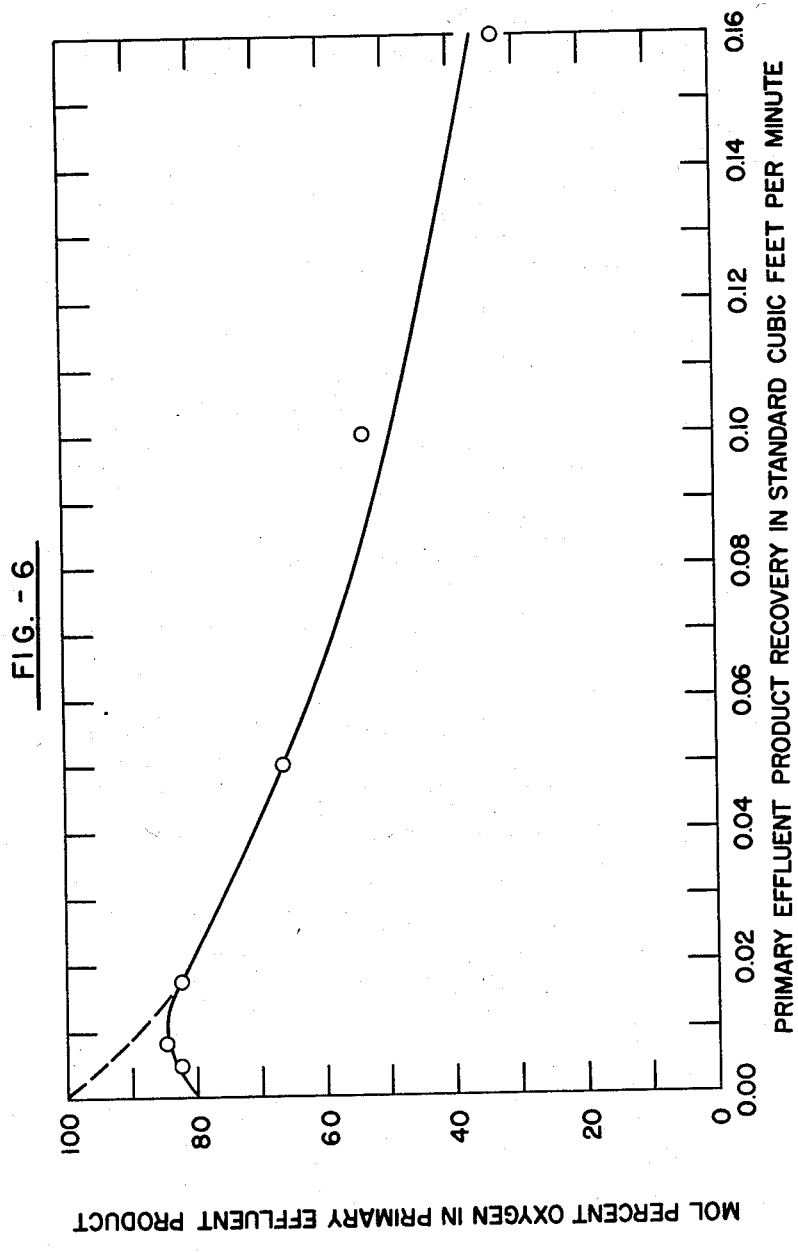
Figure 7:
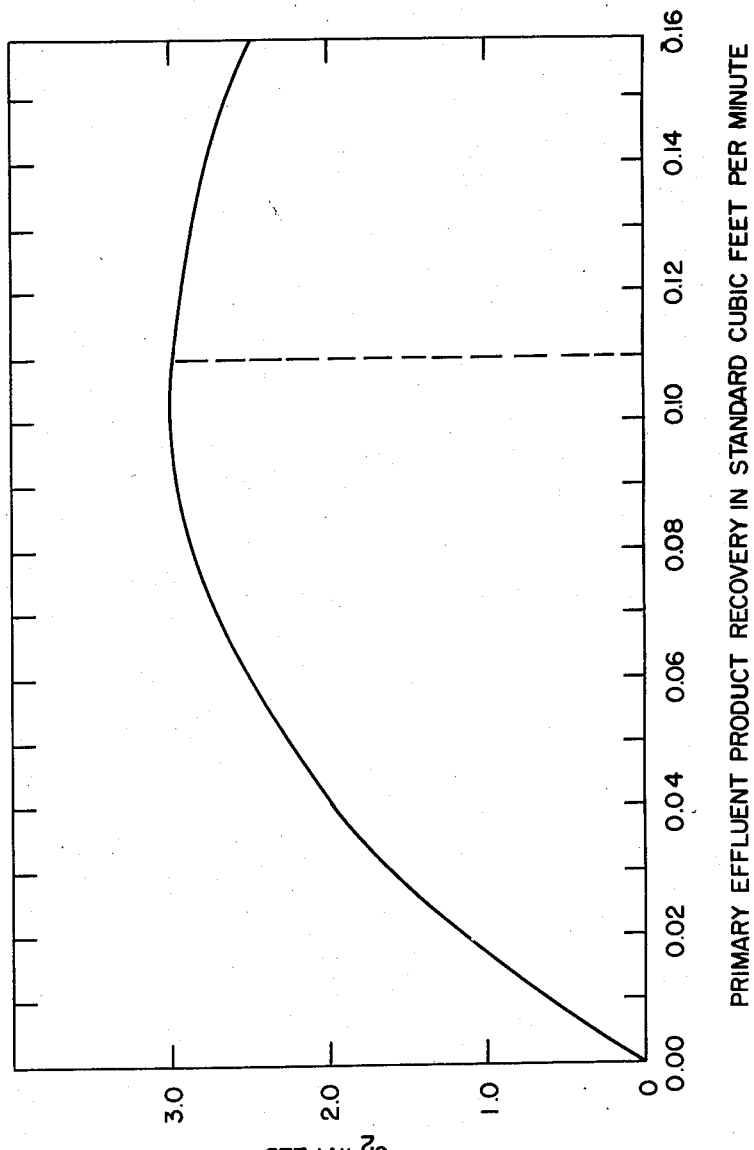
Figure 8:
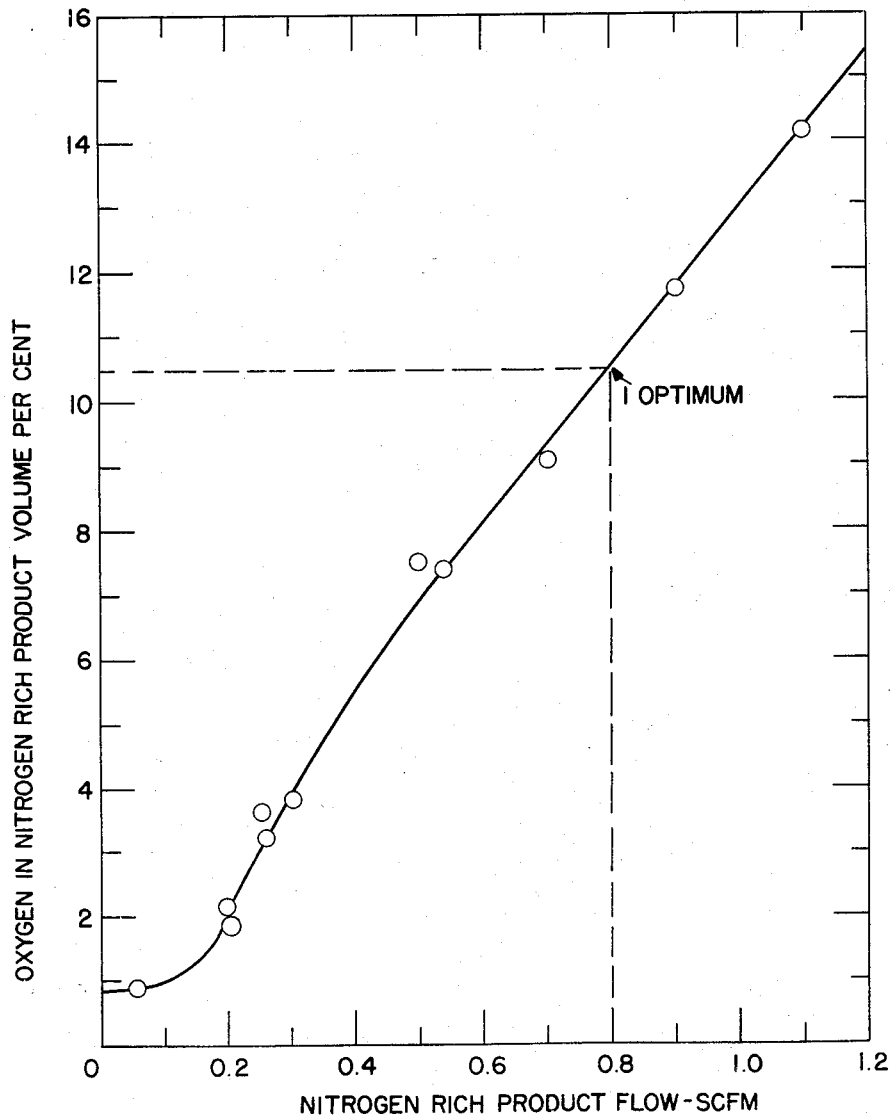

Figs. 3 to 3D inclusive schematically illustrate the fundamental operational concepts involved in the practice of the present invention;

Fig. 4 is a graphic illustration of the manner in which the conditioning of a system according to the present invention proceeds to produce a result substantially as illustrated in Fig. 2;

Fig. 5 is a graphic illustration of the results obtained by an operation according to the present invention, wherein the system was employed for the purpose of removing nitrogen from an input air stream to produce an oxygen-rich effluent product, and specifically indicating the effect of modifying one operating condition while maintaining another constant;

Fig. 6 illustrates graphically the effect produced by reversing the roles of the modified and constant operating conditions in the operation represented by Fig. 5;

Fig. 7 illustrates graphically the determination of an optimum result from a system operating under the conditions represented by the showing of Fig. 6, wherein the volumetric recovery of a product effluent is related to the percentage oxygen enrichment of such effluent;

Fig. 8 illustrates graphically the determination of an optimum result from a system adapted to concentrate nitrogen in the primary effluent product derived from a gaseous mixture, wherein nitrogen is a major component portion; and Fig. 9 is a diagrammatic showing of a system for fractionating a gaseous mixture of at least two major components to produce separate effluent product streams, each rich in one such major component.

Figure 1:
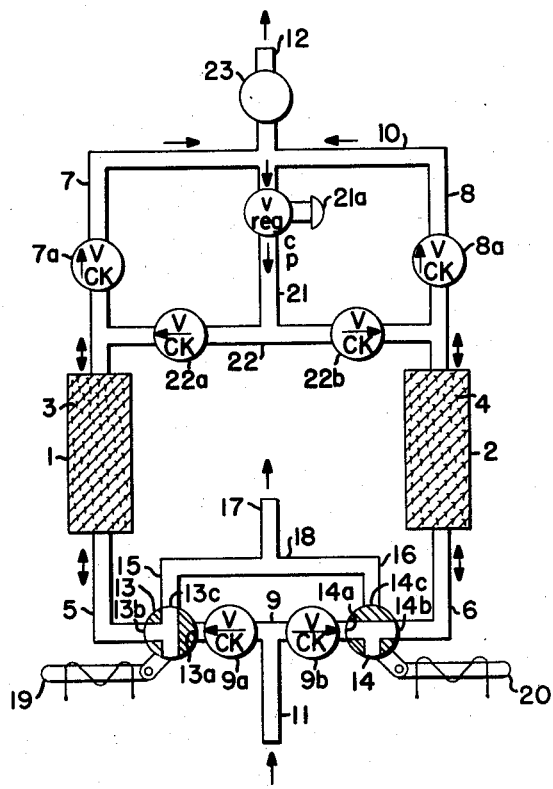
Fig. 1 is a diagrammatic showing of an apparatus according to the present invention, illustrating flow connections and controls adapted to accomplish the method contemplated.

In the apparatus as shown by Fig. 1, the numerals 1 and 2 each designates one of a pair of adsorber vessels. Each vessel is adapted to contain and be substantially fully packed with an adsorbent material, to be later described in greater detail. As shown, the adsorbent packing material in vessel 1 is designated by the numeral 3, and that in vessel 2 by the numeral 4.

Each vessel is equipped with conduit connections providing for the passage of untreated or treated gaseous materials through the respective vessels and for otherwise handling such materials in the system. The numerals 5 and 6 respectively designate combined input and purge conduits for the respective vessels 1 and 2, and the numerals 7 and 8 correspondingly designate primary effluent discharge conduits. Each of the conduits 5 and 6 is connected at its outer end to a common inlet manifold conduit 9, and each of the conduits 7 and 8 are in turn connected to a common discharge manifold conduit 10. A conduit 11 for introducing an initial gaseous material feed into the system is connected to the inlet manifold 9, while a conduit 12 connects with the discharge manifold 10 to provide for discharge of a first product effluent from the system.

The numerals 13 and 14 designate respective elements of a pair of three-port, flow-switching valves connected in the manifold 9 on opposite sides of the connection thereto of the feed or supply conduit 11, and respectively intermediate such connection and the conduits 5 and 6. Check valves $9a$ and $9b$ are also disposed in the manifold between the supply conduit connection thereto and the respective valves 13 and 14. These check valves are adapted to permit flow only in the direction of the valves 13 and 14 respectively. In the respective valves 13 and 14, the ports are designated by the letters $a$, $b$, and $c$ plus the numeral designating the valve. In each valve the port $a$ is connected to that portion of the manifold 9 communicating directly with the supply conduit 11; the port $b$ is connected to that portion of the manifold communicating directly with a corresponding input and purge conduit such as 5 or 6; and the port $c$ is connected to a conduit for discharge of a second effluent from one of the adsorber vessels. As shown, the ports $13a$ and $14a$ are connected to communicate through manifold 9 with supply conduit 11; ports $13b$ and $14b$ are connected to communicate through manifold 9 with conduits 5 and 6 respectively; and the ports $13c$ and $14c$ are connected to discharge conduits 15 and 16 respectively for discharge of a secondary effluent from the respective vessels 1 and 2. The conduits 15 and 16 in turn communicate with a common discharge conduit 17 through a manifold connection 18.

The valves 13 and 14 are preferably provided for automatic, cyclical operation so as alternately to connect one of the vessels 1 and 2, through their respective conduit connections 5 and 6 and manifold 9, with either the supply conduit 11 or an effluent discharge conduit connection 15 and 16 respectively. In the drawing, the valves 13 and 14 are representatively equipped for automatic operation as by means of solenoids 19 and 20 respectively. Also, as thus equipped, the solenoids 19 and 20 are preferably activated by means such as a cycle timing device, not shown.

In the apparatus illustrated, the valve 13 has been actuated to provide for purge discharge from the vessel 1 through conduits 5, 9, and 15 by way of valve ports $13b$ and $13c$. At the same time, or slightly in advance, the valve 14 has been actuated to provide for introduction of a gaseous feed material into the vessel 2 through conduits 11, 9 and 6 by way of the valve ports $14a$ and $14b$. Subsequent operation of the valves in a regular cycle, as later described, would accomplish an opposite relationship of the valves to their respective conduits and communicating vessels.

Now referring further to the conduit connections which include the conduits 7 and 8 and manifold 10, as shown, the latter is provided with a branch conduit connection 21 in which is disposed a pressure reducing control valve $21a$. This valve may be differential control valve designed to maintain a relatively constant pressure differential between the inlet and the outlet ports thereof. Additionally, and as particularly illustrated in Fig. 1, valve $21a$ may exercise control to maintain a constant pressure at its outlet port. Flow through the valve is always in the direction indicated by the arrows.

The numeral 22 designates a conduit cross section between the conduits 7 and 8, which cross connection 22 includes check valves $22a$ and $22b$ adapted to close against flow from and to open for flow toward the respective conduits 7 and 8. Check valves $7a$ and $8a$ respectively provide against flow through the conduits 7 and 8 in the direction of the respective vessels 1 and 2 with which these conduits communicate.

Reverting now to the adsorbent packing material designated in the vessels 1 and 2 by the numerals 3 and 4 respectively, this material may be any adsorbent material which has a selective affinity for one or more of the components of the gas mixture supplied to the system by way of the conduit 11. As shown, the adsorbent material is uniform and continuous throughout each vessel. If desired, however, the vessels may be packed with a number of different adsorbent materials arranged in layers. In such instance, it is preferred that the layers be physically separated. For example, separator plates may be introduced such connection and extend diametrically across the vessel, or each adsorbent may be prepacked in a suitable carrier container and the several containers inserted to form a series from one end of a vessel to the other.

Depending upon the operation contemplated, the adsorbent employed may be selected from such materials as activated carbon, alumina, silica gel, glass wool, adsorbent cotton, and even soft tissue paper. Various metal oxides, clays, Fuller's earth, bone char, etc. also have adsorbent characteristics which may be utilized according to the present invention. Still another adsorbent material of the character contemplated is one known as Mobilbeads, which is a siliceous moisture adsorbing compound.

Other absorbent materials suitable for employment according to the present invention include materials known as molecular sieves. This class of materials includes certain zeolites, both naturally-occurring and synthetic, which have crystalline structures containing a large number of small cavities interconnected by a number of still smaller holes or pores, the latter being of exceptional uniform size. The pores may vary in diameter from 3 to 5 Angstrom units, to 12 to 15 or more. For a particular molecular sieve material, however, the pore sizes are substantially uniform and accordingly the material normally will be designated by the characteristic size of its pores.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. 2,442,191. Zeolites vary somewhat in composition, but generally contain silica, aluminum, oxygen, and an alkali and/or alkaline earth element, e.g., sodium and/or calcium, magnesium, etc. Analcite has the empirical formula $NaAlSi_2O_6.H_2O$. Barrer (U.S. 2,306,610) teaches that all or part of the sodium is replaceable by calcium to yield, on dehydration, a molecular sieve having the formula $(CaNa_2) Al_2Si_4O_{12}.2H_2O$. Black (U.S. 2,522,426) describes a synthetic molecular sieve having the formula $4CaO.Al_2O_3.4SiO_2$.

The synthesis of molecular sieves having uniform pore sizes of 4 and 5 Angstrom units may be accomplished by mixing an aqueous solution of an alkali metal silicate having a ratio of alkali metal oxide/$SiO_2$ of about 0.8 to 1 or higher with a solution of sodium aluminate having a ratio of $Na_2O$ to $Al_2O_3$ of about 1/1–3/1 at a temperature of from about 160° to about 215° in such proportions as to give a ratio of $SiO_2$ to $Al_2O_3$ in the mixture of 0.5–3/1. The mixture is held at the stated temperatures for a period of time sufficient to form a crystalline sodium aluminosilicate, which is a molecular sieve material having a uniform pore size of about 4 Angstrom units. A pore size of about 5 Angstrom units may be produced in this material by base exchange reaction with an alkaline earth metal such as calcium, in the form of calcium chloride for example. In either instance, the molecular sieve material produced is water washed and activated by calcining.

The synthesis of a molecular sieve material having a pore size of about 13 Angstrom units may be produced by mixing an aqueous solution of an alkali metal silicate having a ratio of alkali metal oxide/SiO$_2$ of about 1/1 or higher with a solution of sodium aluminate having a ratio of Na$_2$O to Al$_2$O$_3$ of 1/1–3/1 at 160° to about 250° F. in proportions such as to give a ratio of SiO$_2$ to Al$_2$O$_3$ in the mixture of 3/1–10/1. This mixture is then held at the stated temperatures for at least an hour, and preferably longer, thereby producing the molecular sieve material desired. The recovered sieve material is water washed and activated by calcining.

A large number of other naturally-occurring zeolites have molecular sieve activity, i.e., the ability to selectively adsorb certain components or component portions of a gaseous mixture. This selectivity stems from the fact that only molecules small enough to enter the pores will be adsorbed. Molecule size alone, however, is not the sole requirement for selective adsorption. It appears that a relative affinity of a molecule for the adsorbent as compared to other molecules or an initial relative rate of adsorption phenomena must be present. Of the materials contemplated for use according to the present invention, one having a uniform pore size of about 4 Angstroms has been found especially suitable for concentration of nitrogen in a primary effluent product derived from atmospheric air. A molecular sieve material having a uniform pore size of about 5 Angstroms has been found to be a satisfactory adsorbent for the concentration of oxygen in the primary effluent product derived from atmospheric air, according to the present invention. When employed in substantially the same manner as the 5 Angstrom pore size molecular sieve material, a molecular sieve material having a uniform pore size of about 13 Angstroms also has been found to be suitable for the concentration of oxygen in the primary effluent product derived from atmospheric air. Each of the molecular sieve materials mentioned also exhibits an affinity for moisture, and to some extent carbon dioxide. Accordingly, the primary effluent product derived by the use of these materials from a feed stream of atmospheric air will not only be rich in either nitrogen or oxygen, according to the material used, but also will be dry.

The 4 A., 5 A., and 13 A. molecular sieve materials have certain characteristic affinities for particular types of hydrocarbons. In this respect, the adsorptive characteristic of 4 A., 5 A., and 13 A., molecular sieves are represented in the following table:

only slight affinity for carbon dioxide. Preferably the adsorbent material employed is one which has an affinity for those components not desired in a primary effluent product, or which may be most advantageously recoverable from a secondary effluent product, both as later identified.

In the preferred practice of the method, according to the present invention, a stream of a gaseous mixture under positive pressure is passed, cyclically and in alternating sequence, through each of two paired adsorption zones, the ambient atmosphere of the zones being substantially maintained at a temperature such as to maintain the feed material and the effluent products in a vapor or gas phase. The stream introduced into each zone is passed over and through a body of an adsorbent contained in the zone, which adsorbent material has a selective affinity for at least one key component portion of the mixture. During passage of the original feed stream of the mixture through a zone, the zone is on an adsorption cycle. During this cycle, the zone is maintained at substantially the pressure of the original feed stream introduced thereinto. After passage through the zone, a gaseous effluent product is discharged from the zone under substantially the pressure of the initial stream.

While either zone is on an adsorption cycle, pressure on the other zone of the pair is reduced, as by opening it to the atmosphere or another zone of reduced pressure. In this condition, the other zone is on a desorption cycle. At substantially the same time, a portion of the primary effluent product from the zone then on an adsorption cycle is withdrawn from the total primary effluent discharge, and this withdrawn portion is introduced into the reduced pressure zone, which is on a desorption cycle, so as to pass over and through the body of the adsorbent contained therein. Passage of this withdrawn portion through the zone on desorption cycle is in counterflow relation to passage of the initial stream passed through such zone while it was on adsorption cycle. As thus introduced, the discharged primary effluent product is relatively free of the key component or components retained by and present in the adsorbent contained in the zone on a desorption cycle. Also the adsorbent therein will have been slightly heated by the heat of adsorption induced during a previous adsorption cycle. By proper adjustment of the adsorption-desorption cycle periods, the heat of adsorption during the

| Adsorbed on 4 A. and 5 A. | Adsorbed on 5 A. but not 4 A. | Not adsorbed on 4 A. or 5 A. | Adsorbed on 13 A. |
| --- | --- | --- | --- |
| (1) Ethane. | (1) Propane and higher n-paraffins. | (1) Isoparaffins. | (1) All hydrocarbons within gasoline boiling range. |
| (2) Ethylene. | (2) Butene and higher n-olefins. | (2) Aromatics. | (2) Aromatics strongly adsorbed. |
| (3) Propylene. |  | (3) All cyclics with 4 or more atoms in ring. | (3) Diolefins strongly adsorbed. |

As indicated from this table the method and apparatus according to the present invention may be employed for the separation of materials such as ethane, ethylene, or propylene from a mixture with propane and higher n-paraffins or butene and higher n-olefins by the use of 4 A. sieves. Likewise, isoparaffins, aromatics and all cyclics with 4 or more atoms in the ring may be separated from any of the previously mentioned hydrocarbon material by the use of either 4 A. or 5 A. molecular sieves.

As has been indicated above, many of the adsorbent materials listed are selective for more than a single key component. For example, activated alumina may be employed to adsorb water vapor and carbon dioxide simultaneously from a gaseous mixture in which they may be present, while silica gel adsorbents, including Mobilbeads, although adsorbent for water vapor, have pressure cycle is conserved and available to counteract the effects of cooling produced during the desorption cycle.

One great advantage of the present process is the conservation of heat evolved on the adsorption cycle. Processes as heretofore known in the art conducted the adsorption cycle for a period sufficient to raise the delta T appreciably, thereby permitting or causing heat to flow through the bed, as well as through the walls of the adsorption vessel, thus to be substantially lost. In accordance with the present invention, wherein rapid cycling is employed between the adsorption and the desorption phases, the delta T on the adsorption zone is relatively small. This tends to greatly reduce the flow of heat. Due to the short time on the adsorption cycle, heat will not have time to flow through the bed, and through the walls of the vessel into the surrounding atmosphere. By rapid cycling from adsorption to desorption in the respective zones, the desorption cycle will substantially completely utilize the heat produced during the adsorption cycle. As pointed out above, this is due to the low delta T attained, and due to the lack of time for dissipation of the heat of adsorption. In effect, the beds function as highly efficient, rapidly cycled, bead heat exchangers. Generally, the time on the adsorption cycle in accordance with the present invention does not exceed 2–3 minutes and is preferably less than 1 minute. A very desirable time on the adsorption cycle is less than 20 seconds as, for example, 10 seconds. The particular times utilized depend upon various factors, such as the particular adsorbent utilized, the height of the bed, the nature of the key component, and other operating variables.

The combination of temperature and reduced pressure, plus the flushing or scavenging effect of the primary effluent product reflux portion used for backwashing, prepares the adsorbent to adsorb the key component or components from the stream of the gaseous mixture introduced during the next adsorption cycle for this zone. Desorption of the adsorbed key component is additionally facilitated by the fact that the gaseous mixture constituting the primary effluent product reflux portion which is passed through the zone has acquired a renewed capacity to take up the key component desorbed from the adsorbent. In effect, the desorption step, accomplished in one zone of a pair of zones, involves a backwashing action by the primary effluent product reflux portion withdrawn from the primary product stream discharged from the contemporary adsorption cycle of the other zone in such pair, and may be accomplished without addition of heat from an outside source.

For the purpose of this description, the effluent discharged from a zone which is on its adsorption cycle is termed the "primary effluent product," while the effluent discharged from a zone which is on its desorption cycle is termed the "secondary" effluent product. In the primary effluent product, the key component or components will be present in a minimum concentration. In the secondary effluent product, the key component or components will be present in a maximum concentration.

As a result of the backwashing step for desorption of the key component or components from the adsorption zones, to a degree, the components of the secondary effluent product will correspond to those of the initial feed of the gaseous mixture. The primary effluent product normally will be the product toward which the method is directed. Where the secondary effluent product has no specific utility, as where the adsorbed key components may be such as water vapor and small amounts of carbon dioxide, during its desorption cycle, the discharge from either zone may be vented to the atmosphere, or otherwise disposed of as a waste product. Where the secondary effluent may be such as to warrant recovery of the adsorbed key components, it may be discharged to an accumulator or storage zone, or fed to a suitable recovery or treating zone directly, in any suitable fashion.

In the method contemplated, the initial gaseous mixture fed to the system should be a material which does not contain appreciable amounts of components which exhibit higher heats of condensation or adsorption than the key components, under the operation conditions presently contemplated by this invention, and which are also strongly adsorbed by the adsorbents selective for such key components. Where components which have such characteristics are present in appreciable amounts, their adsorption tends unduly to raise the temperature of the adsorbing zone, and thereby to increase the vapor pressure of an adsorbed key component beyond the condition at which it may be satisfactorily retained or accepted by the adsorbent. Likewise, under such conditions, desorption of the components having those undesirable characteristics set forth above, tend unduly to lower the temperature of the desorbing zone beyond the condition at which the key component is readily given up by the adsorbent. To some extent, however, the effect of such strongly adsorbed components may be counteracted by provision of heat exchange means in the respective adsorption zones whereby the temperatures of the zones may be maintained at levels such as to permit effective adsorption and desorption of the key components. For example, the heat produced in an adsorption cycle in one zone may be utilized to counteract the cooling effect produced by the desorption cycle in the other zone.

The apparatus of the present invention, as illustrated by Fig. 1, has particular utility in a method, such as generally described above, for drying air streams. In such employment, a cycle timer (not shown) was electrically connected to activate the solenoids 19 and 20, and thereby to actuate the valves 13 and 14 at three minute intervals; each valve being "open" for such period while the other was "closed" for that period.

When "open" a valve provides for communication between the inlet conduit 11 and one of the adsorbers by way of the valve and the connecting conduits. In the drawing, the valve 14 is "open" and provides such communication by way of ports 14a and 14b, and the conduit 6 to adsorber 2. The other valve 13 is shown as "closed," in which position it provides communication between the adsorber 1 and the discharge conduit 17, by manifold 9, and way of the ports 13b and 13c. These positions correspond oppositely from valve to valve during the operation described.

Each of the adsorber vessels employed was about 12 inches long and about 1½ inches in diameter, each having a capacity to hold about one pound of Mobilbeads with which each was packed for the operation now described. As employed, the Mobilbeads preferably may be of from ¼ to 8 mesh size.

In this particular operation, a pressurized air stream having a moisture content of about four thousand molecular parts per million parts of air was supplied through the conduit 11. By timed energization of the solenoids 19 and 20, the valves 13 and 14 were actuated to cycle flow wet air alternately through each of the adsorbers 1 and 2. During the on cycle time, a primary effluent product was discharged from the adsorber on cycle by way of the discharge conduit opening therefrom. The wet air input through conduit 11 was adjusted by means of valves 21a and 23, to obtain a total primary effluent flow rate of about 1.0 standard cubic foot per minute. Pressure on the input stream to the on cycle adsorber was maintained in the vicinity of forty pounds per square inch gauge. The ambient atmosphere of the system was at about room temperature.

During the off cycle time of either adsorber, a portion of the total primary effluent product was withdrawn from the stream thereof discharged from the other or alternate adsorber and was passed through a discharge conduit such as 8 of Fig. 1. This portion was withdrawn, as through conduit 21 and 22 through the valve 21a and check valve 22a and thence by way of the conduit 7 to pass through the off cycle adsorber, in this instance adsorber 1. The primary effluent product was withdrawn from conduits 7 and 8 automatically by action of the regulating valve 21a and the differential pressure across the valve as a result of the valves 13 or 14 being closed, whereby to connect the adsorbers 1 and 2 respectively and in timed cyclical sequence with the secondary effluent discharge conduit 17.

Withdrawal of the primary effluent product was accomplished at the rate of about 0.5 standard cubic foot per minute. The residual effluent product stream was discharged by way of conduit 17. The withdrawn portion after passing through and over the adsorbent in either of the adsorbers 1 or 2, and having substantially purged the adsorbent material therein of moisture from the previous on cycle period was discharged from the system as a secondary effluent product by way of the corresponding conduits 5 and 6, valves 13 and 14, conduits 15 and 16, the manifold 18 and the discharge conduit 17 to a zone of lower pressure, in this instance, the atmosphere.

Considering the method and apparatus described with reference to a specific procedure for drying a moist air stream as substantially typical, once a stabilized operating condition has been reached a material balance operating condition may be calculated according to the following formula:

$$R = \left(\frac{R+D}{P_1/P_0}\right)$$

In this equation $R$=the reflux, recycle, or purge flow rate in standard cubic feet per minute; $D$=the dry primary effluent product recovered from the system in standard cubic feet per minute; and $P_1/P_0$=the ratio of the adsorption cycle pressure to the desorption cycle pressure in absolute values. According to this equation, when the purge flow and recovered primary effluent product satisfy the equation, the moisture removed in the secondary effluent product in each desorption cycle will equal the moisture removed from the feed gas stream during the adsorption cycle.

If in the foregoing equation the volume of recovered primary effluent product according to the operating example given above is substituted for D in the equation and with the pressure relationships indicated, the equation becomes $$R = \left(\frac{R+0.5}{3.7}\right) = 0.185 \text{ s.c.f.m.}$$

In other words, having reached a stabilized operating condition, it requires a purge flow of 0.185 standard cubic feet per minute to maintain that condition. As may be determined by reference to the operating condition as set forth in the example above, the purge flow there is somewhat in excess of that required according to the equation. This excess purge flow is essential initially to speed the establishment of the desired material balance. From that point on it is available through adjustment of the valve 21a to provide for greater primary effluent recovery or where circumstances may warrant to accommodate sudden increases in the content of the key component portion in the feed stream.

Fig. 2 graphically illustrates the result obtained by operation of the system in the manner described above. The air fed to the system had an initial moisture content of four thousand mol parts per million. After one day's continuous operation, cyclically reversing the flow through the adsorbers to produce an on cycle and off cycle interval of three minutes for each adsorber, the moisture content of the effluent product stream in conduits 7 and 8 had been reduced to between about fifteen and thirty mol parts per million. Over the next four days, and maintaining the original operating conditions substantially constant, the moisture content of the primary effluent product streams from the adsorber 1 and 2 was reduced to about one mol part per million, at which level it became stabilized.

If desired, the time required to reach a stabilized operating condition may be considerably reduced by withdrawing or diverting the entire primary effluent product of an adsorber which is on cycle to the one which is off cycle. The capacity of the adsorbers may be increased by increasing the ratio between the on cycle and off cycle pressures of the adsorbers. It may also be increased by decreasing the cycle time, although in the operation for drying air a cycle time of between about one and five minutes duration is preferred, too rapid flow switching being wasteful of the feed material. Where water vapor and carbon dioxide are to be removed from the feed air stream, however, it is preferred to use activated alumina of ¼ to 8 mesh size particles and a flow-switching cycle of about one-half minute. The capacity of the adsorbers may also be increased, of course, by increasing their volume and thereby the amounts of adsorbent contained. In general, the capacity is increased in direct proportion to an increase in the adsorbent volume. For example, if the adsorbent is doubled, the capacity is doubled.

In an operation such as described, employing Mobilbeads of ¼ to 8 mesh as the adsorbent material for adsorption of water vapor from air, a preferred maximum volumetric flow through the adsorption zones is about 15 times the gross volume of adsorbent during each on cycle period. Where fine glass wool is used as the adsorbent a maximum volumetric flow through the adsorption zones is preferably about 0.9 times the gross adsorbent volume. Where carbon dioxide and water vapor are key components to be removed simultaneously, and activated alumina is thus employed, a maximum volumetric flow through the adsorption zones is preferably about 2.6 times the gross volume of the adsorbent. All such flow conditions are related to and calculated at the temperature and pressure of the adsorption cycle, and under conditions of ambient temperature for the system which temperature is substantially room temperature.

As noted above, Fig. 3 and Figs. 3A to 3D inclusive schematically illustrate the manner in which a system as contemplated by the invention achieves a stabilized operating condition. Of these figures, Fig. 3 represents a simple adsorption system, having a single chamber, for the purpose of indicating the fundamental concept involved by the practice of this invention. Figs. 3A to 3D inclusive illustrate the application of this concept to a dual adsorption chamber system, such as that represented by Fig. 1, wherein the system is initially stabilized or conditioned by repeated counterflow recycling of the total primary effluent product from each chamber to the other. These figures also illustrate the progressive nature of such a conditioning procedure, including the development of a moisture or vapor pressure front in the adsorbent bed of each chamber.

Referring now to Fig. 3, let it be assumed that the adsorbent chamber 31 is filled with a bed 33 of adsorbent selective for a key component such as water vapor in air. If a stream of air containing water vapor with a vapor pressure of 16 millimeters of mercury at 60 pounds per square inch absolute is passed through the chamber and the adsorbent therein, by way of inlet and outlet conduits 35 and 37 respectively, at a constant number of standard cubic feet per minute, eventually the water retained by the adsorbent will reach a vapor pressure equilibrium with that of the air flowing over the adsorbent wherein it will have a vapor pressure of 16 mm. of mercury.

Now, if the inlet air stream pressure is reduced to 15 pounds per square inch absolute, with the mass flow and water vapor concentration remaining constant, the water vapor in the stream will exhibit a partial pressure of 4 millimeters of mercury. At the instant of pressure change, however, the water retained by the adsorbent still has a vapor pressure of 16 millimeters of mercury. Exposed to an environment of 4 millimeters of mercury, the retained water will adjust to this environment by giving up vapor to the air flowing over the adsorbent. Thus the adsorbent becomes drier. Initially the discharge from the chamber will contain water vapor at a partial pressure of 16 mm. of mercury. As flow continues this pressure diminishes to a point of final equilibrium at 4 mm. of mercury.

If the pressure of the inlet air stream is now returned to its initial value of 60 p.s.i.a., the water vapor contained therein again will have a partial pressure of 16 mm. Hg. As this water vapor contacts the adsorbent holding water with a partial pressure of 4 mm. Hg, water will be adsorbed from the air stream until a state of equilibrium is reached once more. The exit air stream then initially will contain water vapor at a partial pressure of 4 mm. Hg. As flow continues this partial pressure increases.

Thus, for a short time in each pressure cycle, the concentration of water vapor in the effluent air stream leaving the chamber by way of the conduit 37 will increase as the stream pressure is reduced and decrease as the stream pressure is raised. The phenomenon described is utilized according to the present invention and is further demonstrated by the conditioning of a dual chamber system described by reference to Figs. 3A to 3D inclusive.

In the apparatus represented by Figs. 3A to 3D inclusive, the numerals 41 and 42, respectively, designate two adsorbent chambers. The chambers have dual purpose inlet and discharge conduit connections 45 and 47, and 46 and 50 respectively. The conduits 47 and 46 are substantially continuous through a common valve connection 51. The numerals 43 and 44 designate the selective adsorbent beds of the respective chambers 41 and 42.

Assuming the valve 51 to be wide open, if an air stream containing water vapor having a partial pressure of 16 millimeters of mercury at an initial pressure of 60 pounds per square inch absolute is introduced through conduit 45 and discharged through conduit 50, the two adsorbent beds 43 and 44 will come to equilibrium with water retained therein at a vapor pressure of 16 mm. of Hg. With the respective beds in such equilibrium condition, if the valve 51 is now set to produce a 45 pound pressure drop, the partial presure of water vapor contained in the air flowing through the bed 44 will be 4 mm. of Hg. Eventually, the bed 44 will come to equilibrium at this partial pressure, giving up water to the air which is discharged therewith by way of conduit 50.

With chamber 41 at equilibrium, and water retained therein at a vapor pressure of 16 mm. of Hg, and chamber 42 at equilibrium with retained water therein at a vapor pressure of 4 mm. of Hg, if flow through the chambers is reversed in the manner indicated by Fig. 3B, the water vapor in the 60 p.s.i.a. stream entering chamber 42 by way of the conduit 50 will have a partial pressure of 16 mm. of Hg. The adsorbent material 44 will start to remove water from the incoming stream in an effort to achieve equilibrium, thus developing a vapor pressure front designated by the letter $a$. This front moves along the bed in the direction of flow therethrough. As it does so, air which contains water vapor at a partial pressure of 4 mm. of Hg moves ahead of the front and through the valve 51. As the absolute pressure of this air stream is reduced 4:1 in passing through the valve, the partial pressure of contained water vapor is reduced in like fashion. As a result it enters chamber 41 with a partial pressure of 1 mm. of mercury, and develops a vapor pressure front indicated by the letter $b$ ahead of which air with a water vapor partial pressure of 16 mm. of Hg is discharged through the conduit 45.

If the flow direction is again reversed as indicated by Fig. 3C, vapor pressure fronts, as shown, are again moved through the respective beds 43 and 44. On this cycle, the water vapor contained in the air from chamber 41, and which vapor had a partial pressure of 1 mm. of mercury in chamber 41, enters the chamber 42 with a partial pressure of ¼ mm. of mercury behind the front indicated by the letter $c$.

Fig. 3D illustrates the effect of another flow reversal through the chambers 41 and 42, wherein still another vapor pressure front $d$ is developed. The water vapor behind this front now has a partial pressure of 0.0625 mm. of mercury due to the 4:1 reduction achieved by passage through the valve 51. By continued and frequent flow reversal, the fronts eventually merge to develop a water vapor concentration gradient along each chamber. This gradient is evidenced by the somewhat diffuse but relatively well defined front which moves through the chambers in the direction of flow therethrough.

The results of the conditioning procedure just described, is further illustrated graphically by Fig. 4. The sequence of four cycles described above are represented in Fig. 4 by the graphic showing of the progress of the vapor pressure fronts through the length of the adsorber chambers. The fronts represented are lettered for identification with those shown in Figs. 3B to 3D inclusive. In Fig. 4, the fronts established when the chambers have been fully conditioned, and when a merger of preliminary fronts has been attained is designated by the letter $e$. The fronts developed between the fourth cycle front $d$ and the final cycle front $e$ are omitted in the representative showing by Fig. 4 of the progressive recession of the vapor pressure front from the effluent discharge outlet during the conditioning procedure.

When this full flow conditioning procedure is applied to the system as illustrated by Fig. 1, and the primary product effluent streams through conduits 7 and 10 exhibit no measurable amount of the key component adsorbate, the pressure regulating valve 21a may be adjusted so as to obtain any desired recovery of the primary product effluent by way of the conduit 12. From this point on, the pressure cycle periods will be timed to provide for oscillatory movement of the vapor pressure front, such as represented by $e$ in Fig. 4, in a portion of the beds intermediate the ends thereof. By so doing, the break-through of adsorbate on the adsorption cycle, or of the primary product effluent on the desorption cycle is avoided. Under such conditions, the primary product effluent recovered will have a substantially constant and extremely low partial pressure of the initially contained key component portion therein.

Thus far the invention has been described with reference to a procedure for obtaining the maximum or optimum fractionation or separation results. Under certain circumstances, as where it is desired to obtain a primary effluent in which a certain portion of the key component is retained in the primary effluent, the conditioning procedure may be altered somewhat by adjusting the recycled flow of primary effluent from one chamber to the other to a value somewhat lower than the minimum shown to be required according to the formula given above. The result obtained in this way will provide a primary effluent product containing a given percentage of the water content of the initial feed stream. If it is desired that this water content be maintained as a constant and absolute humidity value, the water content of the initial feed stream then must be regulated or controlled to provide the desired absolute humidity in the primary effluent product.

In another operation, an apparatus substantially as shown in Fig. 1, was employed to produce from atmospheric air a primary effluent product having a higher concentration of oxygen than that of the original air stream. For this operation two adsorbers, each 13 inches long by 2.875 inches in diameter were packed with 1000 grams of 5 A. molecular sieves each. Atmospheric air was supplied to the system at a pressure of seventy-five pounds per square inch. The system was at room temperature (70°–80° F.) operated substantially as described above, except that the cyclical actuation of the valves 13 and 14 was timed to produce on cycle flow for an interval of about forty seconds each. Also, in order to obtain a substantially constant primary effluent product flow, the valve timing was set to produce an overlapping on cycle flow wherein the on cycle of one adsorber was initiated about five seconds in advance of termination of the on cycle flow of the other adsorber in the pair employed. In this operation, employing a 5 A. molecular sieve as the adsorbent material, it is preferred that the maximum volumetric flow of the gaseous mixture during any on cycle period be about equal to the gross volume of the adsorbent under conditions of pressure and temperature as set forth above with relation to the adsorption of water vapor from air. Preliminary to a standard operation, the system was operated to determine the improvement produced by the backwashing technique contemplated by this invention. The results of such preliminary operation are indicated by the graphic showing of Fig. 5.

Measurements of oxygen concentration were made with a para-magnetic oxygen analyzer (0–22%) after quantitative dilution with nitrogen. In addition, the oxygen concentration was measured with a gas chromatographic analyzer calibrated for 0–100% oxygen in nitrogen. Moisture content of the oxygen-rich product varied between 2 and 6 p.p.m. as measured by an electrolytic moisture analyzer. Line air moisture was between 3000 and 6000 p.p.m. The apparatus dried the product in addition to concentrating the oxygen.

As indicated by Fig. 5, with a relatively large reflux flow of the primary effluent product, the inherent capacity of the adsorptive material is enhanced. As shown, with cycling, but no reflux flow at all, the concentration of oxygen in the effluent product was increased from a normal concentration of about 21 mol percent in air to about 30 mol percent in the primary effluent product. As the reflux flow was started the primary effluent product exhibited a tremendous increase in oxygen concentration. With a reflux flow of about 0.1 standard cubic foot per minute a maximum concentration of about 75 mol percent was exhibited. Although further increase in the reflux flow, while maintaining a constant value for the primary effluent product recovery, resulted in a reduced concentration of oxygen, the least concentration exhibited, with a reflux flow of 0.4 standard cubic foot per minute, was nearly 55 mol percent, an improvement of about 25 mol percent. The results, as graphically illustrated, demonstrate that the effect of primary effluent product reflux is to markedly decrease the concentration of the key component in the product effluent. In this instance the key component is nitrogen.

In a commercial application of the invention, of course, primary effluent product recovery requirements might vary between large product recovery with low concentration of the nonadsorbed components and low product recovery with high concentration of nonadsorbed components. Fig. 6 demonstrates the results obtained with a constant reflux flow and with varying amounts of oxygen-rich primary effluent product recovery. The slight divergence of the curve as the recovered effluent product approached zero is assumed to be due to disturbance of the concentration gradients in the adsorbent beds due to the pressure cycling action of the system.

Referring to Fig. 7, the concentration of oxygen in the recovered primary effluent product is plotted against the recovery flow rate of the primary effluent. The ordinates of the graph are a numerical representation of the total product flow in standard cubic feet, minus the reflux flow, multiplied by the difference between the mol percent of oxygen in the air stream fed to the system and the mol percent of oxygen determined in the effluent product. The abscissas express in standard cubic feet per minute the effluent product recovered. As shown, optimum recovery with optimum oxygen concentration is attained at an effluent product recovery rate of about 0.11 standard cubic foot per minute with a total air input of about 1.00 s.c.f.m. and a secondary effluent product recovery rate of about 0.795 s.c.f.m. (including reflux flow of 0.195 s.c.f.m.). This secondary effluent product contains a concentration of the key component, nitrogen, greater than in the air stream fed to the system. If desired the secondary effluent product may be accumulated for subsequent further oxygen recovery, or for recovery of nitrogen, or it may be led directly to additional recovery systems therefor.

The apparatus and method according to the present invention may also be employed for the purpose of concentrating nitrogen in the primary effluent product. In this operation the adsorber chambers are packed with a 4 A. molecular sieve material. Also, the valve 21a is completely closed. The backwashing action or counterflow recycle of the primary effluent product is obtained by limiting cycle time of the adsorption and desorption cycles to an extremely short period, whereby oscillation of the concentration gradient in the adsorbent material is restricted to a narrow range intermediate the ends of the bed of adsorbent material and of the chamber. When operating in this fashion the chamber portion adjacent the outlet for primary effluent product serves as an accumulator zone for such product, whereby it is available for counterflow backwashing when pressure on the chamber is reduced. This includes the product portions which may be held in the pores of the adsorbent as well as in the interstitial spaces of the bed beyond the oscillatory gradient front.

As an example of the procedure for concentrating nitrogen in a primary effluent product, two chambers 13" long x 2.875" in diameter were each filled with 1,000 grams of 4 A. molecular sieve material. Atmospheric air was supplied to the inlet 11 of the apparatus as shown in Fig. 1 at a pressure of 85 pounds per square inch absolute. The cycle timers 19 and 20 were set so as to actuate valves 13 and 14 at ten second intervals whereby flow of the air fed to the system was directed alternately into the adsorbent chambers 1 and 2, and so that while one chamber was on cycle the other chamber was off cycle and open to the atmosphere at a pressure of about 15 pounds per square inch absolute, by suitable action of the valves as previously described.

By operation in this fashion, nitrogen-rich primary effluent product flow was obtained wherein the primary effluent product contained as little as ¾% oxygen. The effectiveness of the operation is illustrated graphically by Fig. 8. By suitable adjustment of the valve 23 in line 12 in the apparatus as shown in Fig. 1, primary effluent product flow was varied between 0 and 1.2 standard cubic feet per minute. As shown, concentration of nitrogen in the primary effluent product ranged from 99.25% to about 65% of the primary effluent product, as determined by the percentage of oxygen present in the primary product effluent. In Fig. 8 the dotted lines extending from points on the abscissa and ordinate of the graph scale to intersect in the graph curve indicate an optimum condition. As shown by the graph, under optimum conditions, product flow was 0.8 standard cubic foot per minute and contained 10.5% oxygen. Under these conditions, the secondary effluent product flow discharged by way of the line 17 of figure was 0.2 standard cubic foot for each desorption cycle. At six cycles per minute, therefore, the total secondary effluent discharge was 1.2 standard cubic feet per minute. Thus, the total discharge of primary and secondary effluent products was 1.2 plus 0.8 or 2.0 standard cubic feet per minute, substantially equaling the feed rate of atmospheric air. The incoming air, of course, had a nitrogen content of approximately 78% or 1.56 standard cubic feet per minute of the 2.0 cubic feet per minute fed into the system. As shown by Fig. 7 at optimum conditions the primary effluent product contained 10.5% oxygen. Additionally, it may contain about 1% argon, or a total of 11.5% diluent components. Thus, the primary effluent product contained approximately 88.5% nitrogen or 0.71 standard cubic foot per minute of the total 0.8 cubic foot of primary effluent product. Relating this recovery to the 1.56 standard cubic feet per minute of nitrogen in the feed air stream, the nitrogen recovery of the method is therefore approximately 45%, indicating an extremely efficient separating technique without the need for extreme pressure and temperature operating conditions. Although the foregoing calculations are based only on the content of nitrogen, oxygen and argon in the incoming feed stream, it is to be noted that both water vapor and carbon dioxide in the original feed will be separated by the adsorbent material and discharged with the secondary effluent product.

Fig. 9 diagrammatically illustrates a system which may be operated according to the method of the present invention whereby to concentrate both oxygen and nitrogen from atmospheric air, and wherein the secondary effluent product discharged from separate nitrogen and oxygen concentrating components of the system is employed to enrich the air feed stream supplied thereto. The apparatus combination illustrated by Fig. 9 employs a series of adsorber systems similar to the one illustrated by Fig. 1. These systems are combined and employed for the purpose of fractionating atmospheric air to produce two product streams of which one is rich in nitrogen and the other is rich in oxygen. In the method contemplated by this combination the secondary effluent product of one adsorber concentration system is cross-cycled so as to provide at least a portion of the feed for the other adsorber concentration system.

In the combination illustrated, four adsorber systems are employed. In each system the component parts are designated by numerals directly comparable with those to designate similar parts in the system illustrated by Fig. 1 except that the numerical designation will be in either a 100, 200, 300 or 400 series. Thus the system for concentrating oxygen is in the 300 series while the system for concentrating nitrogen is in the 400 series. The systems for removing moisture and carbon dioxide from the feed to each of the nitrogen and oxygen concentration systems are numbered in the 100 and 200 series respectively. Thus the feed to the nitrogen concentration system passes through a drier system numbered in the 100 series, while the feed to the oxygen concentration system passes through a drier system numbered in the 200 series.

Each of the drier systems includes an inlet conduit 111 and 211 respectively, connected to the discharge of a compressor or pump 100b and 200b respectively. The inlets of the respective pumps are connected to conduits which include non-mixing air surge tanks 100a and 200a respectively. These tanks are each packed with an inert loose granular or fibrous material such as glass wool, glass beads, aluminum pellets, etc., which offer a substantial resistance to mixing. The tanks open to the atmosphere at one end and as indicated are connected at the other end to the inlet of a compressor pump 100b or 200b. The primary effluent product discharge from each of the adsorbers systems in the 100 or 200 series is delivered by means of the conduits 112 and 212 respectively to accumulator chambers 100c and 200c respectively. Thence, these primary product effluents are delivered to the respective nitrogen and oxygen concentrator systems by way of feed conduits 411 and 311 respectively. Provision is made in the apparatus combination illustrated for cross-cycling the secondary effluent product of each of the 300 and 400 series systems by cross-connection of the secondary effluent product discharge conduits 317 and 417 to the inlets of the compressors 100b and 200b respectively, intermediate these compressors and their associated surge tanks 100a and 200a.

In the apparatus combination as illustrated by Fig. 9, the two compressor pumps, 100b and 200b, inspirate air from the atmosphere through the respective surge tanks 100a and 200a. The pump 100b feeds the drier system in which the component parts are designated by numerals in the 100 series. The feed stream from pump 100b enters this system through the conduit 111 at a pressure, for example, of about 65 pounds per square inch absolute, and is cycled between the adsorber chambers 101 and 102 substantially in the manner described with reference to Fig. 1. In this system, the adsorbent material preferably will be one selective for water vapor, carbon dioxide and trace contaminants such as hydrocarbon vapors. A suitable adsorbent for this purpose is activated alumina. This system also employs a recycle or reflux purge stream derived from the primary effluent product of the adsorber on cycle to backwash the adsorbent material in the adsorber which is off cycle. The secondary effluent product in this system is a mixture of air, water vapor, carbon dioxide, and other trace contaminants, and is discharged directly to the atmosphere through the valves 113 and 114 depending upon which adsorber is on the desorption cycle. At the same time the compressor 200b inspirates a stream of atmospheric air through the conduit which includes the surge tank 200a, discharging air, at approximately 65 pounds per square inch absolute, into the inlet conduit 211 of the drier system in which the component parts are numbered in a 200 series. In this system, also the adsorber chambers 201 and 202 are packed with activated alumina for the purpose of fractionating or separating water, carbon dioxide and other trace contaminants in the same fshion as the 100 series adsorber system, and discharging the separated key component portion of the feed stream as a secondary effluent product by way of the valves and connecting conduits including valves 213 and 214.

The respective drier systems discharge a primary effluent product, which is air from which water, carbon dioxide and other contaminants have been removed by way of their respective discharge conduits 112 and 212. The conduit 112 communicates with an accumulated chamber 100c, while the conduit 212 communicates with a separate accumulator chamber 200c.

From the accumulators 100c and 200c, the primary effluent product of the related 100 and 200 series drier systems is passed respectively to the nitrogen and oxygen concentrator systems. As previously mentioned, 4 A. molecular sieve material has been found to be an excellent adsorbent for selectively removing oxygen from air, whereby to concentrate nitrogen in the primary effluent product of the system. In the apparatus represented and illustrated by Fig. 9, the adsorber chambers 401 and 402 are preferably packed with this material. The primary effluent product delivered to the accumulator 200c by way of the discharge line 212 is passed therefrom through lines 311 to the feed inlet of the adsorber system for concentrating oxygen. In this system the adsorber chambers 301 and 302 may be packed with either 5 A. or 13 A. molecular sieve material, these materials as indicated above having a selective affinity for nitrogen whereby the primary effluent product discharged by way of the line 312 will be an oxygen-rich product.

In each of the nitrogen and oxygen concentrating systems the secondary effluent product, which in the first instance will be relatively rich in oxygen, and in the second instance relatively rich in nitrogen is cross-cycled to the inlet of the compressor pump providing the initial feed for the oxygen and nitrogen adsorber systems respectively. Thus the secondary product effluent from the adsorbers 401 and 402 is discharged by way of conduits 415 and 416, 418 and 417, of which the latter is connected to the inlet to the compressor 200b downstream from the surge chamber 200a. The secondary effluent product from the adsorbers 301 and 302 is discharged by way of the conduits 315, 316, 318 and 317, of which the latter is connected to the inlet of the compressor pump 100b downstream from the surge tank 100a. The surge tanks 100a and 200a are adapted to avoid loss of the secondary effluent products from the respective nitrogen and oxygen concentrators. It is contemplated that each tank will have a volume adequate to accommodate the volume of gas in standard cubic feet which is discharged from one of the adsorber chambers in the nitrogen and oxygen concentrating systems when the pressure in the chamber is reduced from the adsorbing pressure of any given value to a pressure approximating that of the atmosphere.

As previously indicated, each of the adsorber systems in the combination apparatus of Fig. 9 is comparable to the system as illustrated by Fig. 1. Likewise, the drier systems in this combination are operated according to the method recited in connection with Fig. 1 as are the oxygen and nitrogen concentrating systems. Each system may be provided with its own cycle timer (not shown) and the cycle period adjusted to provide the most efficient operation conditions.

Although the description as set forth above exemplifies the method with reference to its employment for certain specific purposes, the invention is not to be considered as especially limited to such use. Other gaseous mixtures may be purified and concentrated by the fractionation procedure set forth, wherein a component portion of a gaseous feed material is adsorbed and desorbed cyclically by a bed of an adsorbent material selective therefor under cycling differential pressure conditions; wherein a concentration gradient of the adsorbed material having a low concentration front is oscillated in an area of the adsorbent bed intermediate the ends thereof; and wherein during the desorption cycles, at least a portion of the primary effluent product of the adsorption step is passed through the adsorbent bed in counterflow relation to the flow direction of the feed material during the adsorption cycles.

As pointed out above, the present invention is concerned with a method of fractionating a gaseous material. In essence, the operation comprises flowing a stream of gaseous material through a bed of adsorbent at a preselected initial pressure and flow direction. The adsorbent is selective for at least one component fraction of said material. The stream is flowed through the bed for a first cycle period less than that required for the bed to come to equilibrium with the component fraction. A primary effluent product comprising an unadsorbed portion of the feed stream is discharged from the bed. At the end of the first cycle period, the flow of the feed stream is interrupted and the initial pressure on the bed reduced. The adsorbed components are desorbed from the bed at the reduced pressure. These desorbed components are discharged from the bed in a flow direction opposite to the flow direction of the feed stream of the gaseous material for a second cycle period. During the second period at least a portion of the primary effluent product is passed through the bed in a flow direction of the desorbed component fraction. This latter mixture comprising a portion of the primary effluent product and the desorbed component is discharged from the bed as a secondary effluent product. The cycle periods are adjusted for a time duration adapted to develop a concentration gradient of the component fraction in said bed wherein the gradient has a front of lowest concentration in a zone intermediate the ends of the bed. An oscillatory movement is imparted to the front substantially within the limits of the zone in a direction and for a distance which corresponds respectively to the direction of the flow through the bed during each cycle period and to the duration thereof.

What is claimed is:

1. A process for the removal of a key component from a gaseous mixture stream utilizing two adsorbent beds each of which is characterized by having a one end and an other end, said process comprising the steps of flowing a feed stream of a gaseous mixture including a key component from one end to the other end through a first bed of an adsorbent initially relatively free of said key component at a preselected initial relatively high pressure and in a positive flow direction in an initial cycle, said adsorbent being preferentially selective for said key component; discharging said gaseous mixture stream from said first bed as a primary effluent; segregating a portion of said primary effluent as a product stream and withdrawing the same; passing the remainder of said primary effluent in reverse flow from the other end to the one end through a second bed of adsorbent at a relatively low pressure, which adsorbent is relatively saturated with said key component as compared to said first bed at the start of said inital cycle, whereby as said initial cycle continues, said first bed becomes relatively saturated with said key component progressively from said one end toward said other end, and whereby said second bed becomes relatively freed from said key component from said other end toward said one end; continuing said initial cycle for a time period less than that required to secure saturation of said first bed at said other end and that required to secure freedom from said key component of said second bed at said one end; thereafter introducing said feed stream into said one end of said second bed in positive flow direction at said initial relatively high pressure; discharging said gaseous mixture stream from said other end of said second bed as a primary effluent; segregating a portion of said last named primary effluent as a product stream and withdrawing the same; passing the remainder of said last named primary effluent in reverse flow from said other end to said one end through said first bed of adsorbent at said relatively low pressure, and thereafter cyclically continuing the operation.

2. A method of fractionating a gaseous mixture of at least two components comprising, at a preselected initial relatively high pressure and initial positive flow direction, flowing a first feed stream of said gaseous material through a first bed of adsorbent selective for a first component of said gaseous mixture, for a first cycle period less than required for said first bed to come to equilibrium with said first component; flowing a second feed stream of said gaseous mixture through a second bed of an adsorbent selective for a second component of said gaseous mixture, for a first cycle period less than required for said second bed to come to equilibrium with said second component; discharging the unadsorbed portion of each said first and second streams from said first and second beds as first and second primary effluent streams respectively; interrupting flow of each said first and second feed streams at the end of said first cycle period and reducing said initial pressure on each said first and second beds; desorbing each said first and second components from said respective first and second beds at said reduced pressure, and discharging said desorbed first and second components from said respective beds in a flow direction opposite to that of said first and second feed streams of said gaseous material, during said second period flowing at least a portion of said first and second primary effluent streams respectively through said first and second beds in the flow direction of said component desorbed therefrom and discharging said first and second primary effluent portions from said respective beds together with said first and second components desorbed from said beds as secondary effluent streams; adjusting said cycle periods for a duration adapted to develop in each said first and second beds a concentration gradient of said respective first and second components in said respective beds; imparting oscillatory movement to said fronts substantially within the limits of said zones in a direction and for a distance which correspond respectively to the direction of flow through said beds during each cycle period and to the duration thereof; and preferentially flowing at least a portion of said secondary effluent streams discharged from said first and second beds during said second cycle period through said second and first beds respectively during said first cycle period; and conducting the fractionation in a manner that substantially the sole transfer of heat to and from the gas occurs in said beds.

3. A method according to claim 1, wherein said gaseous mixture is air and said component includes water vapor.

4. A method according to claim 1 wherein said gaseous mixture is air, and said component includes nitrogen.

5. A method according to claim 4, wherein said adsorbent is a molecular sieve material having a pore size of about 5 Angstroms.

6. A method according to claim 4, wherein said adsorbent is a molecular sieve material having a pore size of about 13 Angstroms.

7. A method according to claim 1, wherein said gaseous mixture is air, and said component includes oxygen.

8. A method according to claim 7, wherein said adsorbent is a molecular sieve material having a pore size of about 4 Angstroms.

9. A method of fractionating a gaseous mixture of at least two components consisting essentially of the steps of flowing a feed stream of said gaseous mixture at a preselected initial relatively high pressure and in an initial positive flow direction through a fixed bed of an adsorbent, selective for at least one component of said mixture, for a first cycle time period less than required for said bed to come to equilibrium with said component, discharging the unadsorbed portion of said feed stream as a primary effluent stream; interrupting flow of said feed stream at the end of said first cycle period and reducing said initial pressure on said bed at the inlet end, desorbing said component from said bed at a reduced pressure, and discharging said desorbed component from said bed in a flow direction opposite to that of said feed stream of gaseous material, for a second cycle time period, during said second time period flowing at least a portion of said primary effluent stream through said bed in the flow direction of said desorbed component and discharging said portion of primary effluent portion from said bed together with said desorbed component as a secondary effluent stream; said time periods being each of such short duration that the heats of adsorption and desorption are substantially balanced within said bed and that substantially the sole transfer of heat to and from the gas occurs in said bed, thereby eliminating the need for the transfer of heat externally with respect to said bed; adjusting said cycle periods for a duration adapted to develop an oscillating concentration gradient of said component in said bed which remains in the bed during both the adsorption and desorption cycle, and imparting oscillatory movement to said front substantially within the limits of said bed.

10. Process as defined by claim 9 wherein said feed stream comprises air, wherein said one component comprises water vapor, wherein said adsorbent is selected from the class consisting of alumina, silica gel, and Mobilbeads of ¼ to 8 mesh and wherein said first cycle period is less than that required for a total volume of air equivalent to fifteen times the gross volume of said adsorbent to flow through said bed, said air volume being measured at the temperature and pressure existing in said bed on the adsorption cycle.

11. Process as defined by claim 9 wherein said gaseous material comprises air, wherein said adsorbent comprises a molecular sieve and wherein said component comprises nitrogen.

12. Process as defined by claim 1 wherein the time of each cycle is for a time period so that the partial pressure of the key component in the gas phase at the discharge end of said second bed does not deviate substantially from the partial pressure of the key component in the gas phase at the inlet of said first bed.

13. A process for the removal of water vapor from a gaseous mixture stream comprising flowing a feed stream of gaseous mixture comprising water vapor from one end to the other end through a first bed of a relatively dry adsorbent at a preselected initial relatively high pressure and in a positive flow direction in an initial cycle, said adsorbent being preferentially selective for said water vapor, discharging the dry portion of said gaseous mixture stream from said first bed as a primary effluent, segregating a portion of said primary effluent as a dry product stream and withdrawing the same, passing the remainder of said primary effluent in reverse flow from one end to the other end through a second bed of adsorbent at a relatively low pressure which adsorbent is relatively saturated with water vapor as compared to said first bed at the start of said initial cycle, whereby as said initial cycle continues, said first bed becomes relatively saturated with water vapor progressively from said one end toward said other end, and whereby said second bed becomes progressively relatively dry from the one end toward said other end, continuing said initial cycle for a time period less than that required to secure complete saturation of said first bed at said other end and that required to secure complete dryness of said second bed at said other end, thereafter introducing said feed stream into said second bed at said other end in positive flow direction at said initial relatively high pressure, discharging the dry portion of said gaseous mixture stream from said one end of said second bed as a primary effluent, segregating a portion of said primary effluent as a dry product stream and withdrawing the same, passing the remainder of said primary effluent in reverse flow from said other end to said one end through said first bed of adsorbent at said relatively low pressure, and thereafter cyclically continuing the operation.

14. Process as defined by claim 13 wherein the time of each cycle is for a time period so that the partial pressure of the water vapor in the gas at the discharge end of said second bed does not deviate substantially from the partial pressure of the water vapor in the gas at the inlet of said first bed.

15. Process as defined by claim 13 wherein a region of lowest concentration of moisture continually exists on said adsorbent material intermediate the point of introduction of said mixture stream into said first bed and the point of withdrawal of said secondary effluent product from said second bed.

16. Operation as defined by claim 13 wherein said cycle is maintained for a time period sufficiently short so that the temperature of said beds is substantially ambient.

17. Operation as defined by claim 13 wherein said beds are self-contained with respect to the transfer of heat.

18. A method for fractionating a gaseous mixture, comprising cyclically and alternately flowing a feed stream of said mixture at a selected initial relatively high pressure through each of two confined adsorption zones into contact with an adsorbent material contained in each, said adsorbent being selective for at least one key component portion of said mixture; progressively adsorbing at least said key component portion from said mixture stream in one of said zones at said selected relatively high pressure, whereby an increasing concentration gradient of said key component on said adsorbent will advance in the direction of flow; discharging said feed stream from said one zone, under substantially the initial pressure thereof, as a primary effluent product; withdrawing at least a portion of said primary effluent product discharged from said one zone; flowing said withdrawn portion through the other of said zones at a secondary relatively low pressure in a counterflow direction relative to the flow direction of said initial stream through each of said zones; progressively desorbing said key component portion previously adsorbed therein, whereby a decreasing concentration gradient of said key component on said adsorbent will advance in the direction of counterflow and discharging a secondary effluent product from said other zone, said secondary effluent product comprising said portion of said primary effluent product and said key component portion, carrying out said cycles for time periods whereby said key component is never completely removed from either zone, and conducting said operation in a first phase under conditions that the volume of said portion of said primary effluent product at said relatively high initial absolute pressure bears a greater ratio to the total volume of said primary effluent than said relatively low absolute pressure bears to said relatively high pressure until a predetermined degree of saturation is attained in said zones, and thereafter in a second phase continuing said operation under conditions wherein the volume of said portion of said primary effluent product at said high pressure bears substantially the same ratio to the volume of said primary effluent as said low pressure bears to said high pressure.

19. Process as defined by claim 18 wherein R represents said portion of said primary effluent product in s.c.f.m., wherein $(R+D)$ represents said primary effluent product in s.c.f.m., wherein $P_1$ represents said initial absolute pressure and $P_0$ represents said secondary absolute pressure; carrying out the operation in said initial phase in a manner that R is greater than $$\frac{R+D}{P_1/P_0}$$

and wherein in said second phase R substantially equals $$\frac{R+D}{P_1/P_0}$$

20. Process as defined by claim 18 wherein in said first phase said portion of said primary effluent product flowed to said other zone comprises essentially said primary effluent.

21. A method for fractionating a gaseous mixture, comprising cyclically and alternately flowing a feed stream of said mixture at a selected initial relatively high pressure through each of two confined adsorption zones into contact with an adsorbent material contained in each, said adsorbent being selective for at least one key component portion of said mixture; progressively adsorbing at least said key component portion from said mixture stream in one of said zones at said selected relatively high pressure, whereby an increasing concentration gradient of said key component on said adsorbent will advance in the direction of flow; discharging the remainder of said mixture stream from said first zone, under substantially the initial pressure thereof, as a primary effluent product; withdrawing at least a portion of said primary effluent product discharged from said one zone; flowing said withdrawn portion through the other of two said zones at a secondary relatively low pressure in a counterflow direction relative to the flow direction of said initial stream through each of said zones; progressively desorbing said key component portion previously adsorbed therein, whereby a decreasing concentration of said key component on said adsorbent will advance in the direction of flow and discharging a secondary effluent product from said other zone, said secondary effluent comprising said portion of said primary effluent product and said key component portion, carrying out said cycles for time periods whereby said key component is never completely removed from either zone and conducting said operation under conditions that the total volume of said primary effluent divided by the volume of primary effluent passed to said other zone is less than the absolute high pressure divided by the absolute low pressure.

22. Process as defined by claim 21 wherein R represents said portion of said primary effluent product in s.c.f.m., wherein $(R+D)$ represents said primary effluent product in s.c.f.m., wherein $P_1$ represents said initial pressure and $P_0$ represents said secondary pressure; carrying out the operation in a manner that R is somewhat greater than $$\frac{R+D}{P_1/P_0}$$

23. Process as defined by claim 13 wherein said gaseous mixture comprises air.

24. Process as defined by claim 13 wherein the volume of primary effluent passed to said second bed at said high pressure is about the same ratio to the total volume of primary effluent as the ratio of the absolute pressure of the low pressure unit is to the absolute pressure of the high pressure unit.

25. A method for fractionating a gaseous mixture stream comprising oxygen and nitrogen, comprising flowing a feed stream of said mixture at a selected initial relatively high pressure through a confined adsorption zone into contact with an adsorbent material, said adsorbent being selective for oxygen of said mixture contained in said zone under conditions that the heats of adsorption and desorption are substantially balanced within said zone, and conducting the fractionation in a manner that substantially the sole transfer of heat in said zone occurs between said material and said stream flowing therethrough, progressively adsorbing oxygen from said mixture stream in said zone, whereby an increasing concentration gradient of oxygen on said adsorbent will advance in the direction of flow; discharging the remainder of said mixture stream from said zone, under substantially the initial pressure thereof, as a nitrogen-rich effluent product stream, thereafter at the inlet end reducing the pressure to a secondary relatively low pressure and progressively desorbing said oxygen adsorbed therein, whereby a decreasing concentration of said oxygen on said adsorbent will advance in the direction of counterflow, and discharging a secondary oxygen-rich effluent product stream from said zone at the end at which said feed stream was introduced and carrying out said cycles for time periods whereby said oxygen component is never completely removed from said zone and whereby an oxygen concentration gradient will remain in said zone during both the adsorption and desorption cycle.

26. An apparatus for adsorptive fractionation of a gaseous mixture, said apparatus comprising (1) two separately defined chamber vessels, (2) a body of adsorbent material in each of said vessels, said bodies being preferentially adsorptive of at least one and the same component of said mixture, (3) primary inlet conduit means connected to each of said vessels wherethrough said gaseous mixture may be supplied to said vessels, (4) valve means in said primary inlet conduit means whereby the supply of said gaseous mixture to said vessels may be alternated from vessel to vessel, (5) primary outlet conduit means connected to each of said vessels wherethrough gaseous material may be removed from said vessels as a primary effluent product, said primary outlet conduit means and said primary inlet conduit means being so connected to said vessels to establish therebetween in each vessel a primary path of flow of gaseous material through each of said bodies of adsorbent material, (6) reflux conduit means connected to each of said vessels wherethrough at least a portion of said primary effluent product removed from either of said vessels may be directed into the other vessel, said reflux conduit means including pressure regulating control valve means whereby a substantially constant preselected pressure may be maintained downstream of said control valve means in the direction of said other vessel for a range of pressures of said primary effluent product exceeding said preselected pressure, (7) secondary outlet conduit means connected to each of said vessels wherethrough gaseous material may be removed from said vessels as a secondary effluent product, said secondary outlet conduit means and said reflux conduit means being so connected to said vessels to establish therebetwen in each vessel a secondary path of flow of gaseous material through each of said bodies of adsorbent material which is substantially coincident with and opposite in direction to said primary path of flow therethrough, and (8) valve means in said secondary outlet conduit means whereby the removal of said secondary effluent product from said vessels may be alternated from vessel to vessel.

27. An apparatus according to claim 26 in which said valve means in said primary inlet conduit means and said valve means in said secondary outlet conduit means together comprise two three-port valves, one of which may alternately permit supply of said gaseous mixture into and removal of said secondary effluent product from one of said vessels, and the other of which may alternately permit supply of said gaseous mixture into and removal of said secondary effluent product from the other of said vessels.

28. An apparatus according to claim 26 which includes actuating means for said valve means in said primary inlet conduit means and said valve means in said secondary outlet conduit means whereby both said valve means are alternately and cyclically thrown to permit start of supply of said gaseous mixture to a first one of said vessels at least no later than start of removal of said secondary effluent product from a second one of said vessels and start of supply of said gaseous mixture to said second one of said vessels at least no later than start of removal of said secondary effluent product from said first one of said vessels.

29. An apparatus for adsorptive fractionation of a gaseous mixture whereby at least two gaseous primary effluent products may be generated, one of said primary effluent products being relatively rich in one of said components of said mixture and the other of said primary effluent products being relatively rich in another of said components thereof, said apparatus comprising (1) separately defined first and second chamber vessels, (2) a body of adsorbent material in each of said first and second vessels, said bodies being preferentially adsorptive of only one and the same of the components of said gaseous mixture in which one of said primary effluent products is relatively rich, (3) first primary inlet conduit means connected to each of said first and second vessels wherethrough gaseous material may be supplied to said vessels, (4) valve means in said first primary inlet conduit means whereby the supply of gaseous material to said first and second vessels may be alternated from vessel to vessel, (5) first primary outlet conduit means connected to each of said first and second vessels wherethrough gaseous material may be removed from said vessels as a first primary effluent product, said first primary outlet conduit means and said first primary inlet conduit means being so connected to said first and second vessels to establish therebetween in each vessel in a primary path of flow of gaseous material through each of said bodies of adsorbent material in said vessels, (6) first secondary outlet conduit means connected to each of said first and second vessels wherethrough gaseous material may be removed from said vessels, said first secondary outlet conduit means being so connected to said first and second vessels with respect to the connection of said first primary outlet conduit means thereon to establish therebetween in each vessel a secondary path of flow of gaseous material through each of said bodies of absorbent material in said vessels which is substantially coincident with and opposite in direction to said primary path of flow therethrough, (7) valve means in said first secondary outlet conduit means whereby the removal of gaseous material from said first and second vessels through said first secondary outlet conduit means may be alternated from vessel to vessel, (8) separately defined third and fourth chamber vessels, (9) a body of adsorbent material in each of said third and fourth vessels, said bodies each being preferentially adsorptive of the other only of the components of said gaseous mixture in which one of said primary effluent products is relatively rich, (10) second primary inlet conduit means connected to each of said third and fourth vessels wherethrough gaseous material may be supplied to said vessels, (11) valve means in said second primary inlet conduit means whereby the supply of gaseous material to said third and fourth vessels may be alternated from vessel to vessel, (12) second primary outlet conduit means connected to each of said third and fourth vessels wherethrough gaseous material may be removed from said vessels as a second primary effluent product, said second primary outlet conduit means and said second primary inlet conduit means being so connected to said third and fourth vessels to establish therebetween in each vessel a primary path of flow of gaseous material through each of said bodies of adsorbent material in said vessels, (13) second secondary outlet conduit means connected to each of said third and fourth vessels wherethrough gaseous material may be removed from said vessels, said second secondary outlet conduit means being so connected to said third and fourth vessels with respect to the connections of said second primary outlet conduit means thereon to establish therebetween in each vessel a secondary path of flow of gaseous material through each of said bodies of adsorbent material in said vessels which is substantially coincident with and opposite in direction to said primary path of flow therethrough, (14) valve means in said second secondary outlet conduit means whereby the removal of gaseous material from said third and fourth vessels through said second secondary outlet conduit means may be alternated from vessel to vessel, (15) first compressor means designed to handle gaseous material and characterized by suction and discharge regions, said first compressor means being so connected at its discharge region to said first primary inlet conduit means that compressed gaseous material leaving said first compressor means may flow toward either of said first and second vessels according to the setting of said valve means in said first primary inlet conduit means, (16) second compressor means designed to handle gaseous material and characterized by suction and discharge regions, said second compressor means being so connected at its discharge region to said second primary inlet conduit means that compressed gaseous material leaving said second compressor means may flow toward either of said third and fourth vessels according to the setting of said valve means in said second primary inlet conduit means, (17) first supply conduit means wherethrough a stream of said gaseous mixture may be furnished from a source of said mixture, said first supply conduit means being connected to the suction region of said first compressor means, (18) second supply conduit means wherethrough a stream of said gaseous mixture may be furnished from a source of said mixture, said second supply conduit means being connected to the suction region of said second compressor means, (19) first transfer conduit means connected between said first secondary outlet conduit means and said second supply conduit means wherethrough gaseous material may flow to said second supply conduit means from either of said first and second vessels according to the setting of said valve means in said first secondary outlet conduit means, and (20) second transfer conduit means connected between said second secondary outlet conduit means and said first supply conduit means wherethrough gaseous material may flow to said first supply conduit means from either of said third and fourth vessels according to the setting of said valve means in said second secondary outlet conduit means.

30. An apparatus according to claim 29 which includes a surge chamber in each of said first and second supply conduit means, said chambers being further respectively from the suction regions of said first and second compressor means than are the connections of said second and first transfer conduit means on said first and second supply conduit means.

31. An apparatus according to claim 29 which includes actuating means for said valve means in said first primary inlet conduit means, said valve means in said first secondary outlet conduit means, said valve means in said second primary inlet conduit means, and said valve means in said second secondary outlet conduit means whereby said several valve means are alternately and cyclically thrown to permit start of supply of gaseous material to said first and third vessels at least no later respectively than start of removal of gaseous material from said second and fourth vessels and start of supply of gaseous material to said second and fourth vessels at least no later respectively than start of removal of gaseous material from said first and third vessels.

32. An apparatus according to claim 29 which includes reflux conduit means connected to each of at least said first and second vessels wherethrough at least a portion of said first primary effluent product removed from either of said vessels may be directed into the other vessel, said reflux conduit means including pressure reducing means, and said reflux conduit means being so connected to said first and second vessels with respect to the connections of said first secondary outlet conduit means thereon to establish therebetween in each vessel a path of flow of gaseous material through each of said bodies of adsorbent material from said reflux conduit means to said first secondary outlet conduit means which is substantially coincident with and opposite in direction to said primary path of flow therethrough.

33. An apparatus according to claim 29 which includes (1) a first preliminary adsorptive fractionating means preferentially adsorptive of at least one component of said gaseous mixture other than the components in which said first and second primary effluent products are relatively rich and substantially non-adsorptive of either of said latter components, said first preliminary adsorptive fractionating means having an inlet region for receiving gaseous material to be preliminarily fractionated therein and an outlet region for discharging non-adsorbed gaseous material, and said first preliminary adsorptive fractionating means being installed intermediate said discharge region of said first compressor means and said first primary inlet conduit means with its inlet region connected to said discharge region of said first compressor means, (2) a second preliminary adsorptive fractionating means preferentially adsorptive of at least one component of said gaseous mixture other than the components in which said first and second primary effluent products are relatively rich and substantially non-adsorptive of either of said latter components, said second preliminary adsorptive fractionating means having an inlet region for receiving gaseous material to be preliminarily fractionated therein and an outlet region for discharging non-adsorbed gaseous material, and said second preliminary adsorptive fractionating means being installed intermediate said discharge region of said second compressor means and said second primary inlet conduit means with its inlet region connected to said discharge region of said second compressor means, (3) a first accumulator chamber installed intermediate said outlet region of said first preliminary adsorptive fractionating means and said first primary inlet conduit means, and (4) a second accumulator chamber installed intermediate said outlet region of said second preliminary adsorptive fractionating means and said second primary inlet conduit means.

34. Process as defined by claim 13 wherein the time of each cycle is for a time period so that substantial equilibrium exists between the moisture in the feed stream and on the adsorbent at said one end of said first bed, and that substantial equilibrium exists between the moisture in the gas and on the adsorbent at said other end of said second bed.

35. A method for fractionating a gaseous mixture comprising flowing a feed stream of said mixture at a selected initial relatively high pressure into one end and through a confined adsorption zone into contact with an adsorbent material selective for at least one component of said mixture, progressively adsorbing said one component from said mixture stream in said zone, whereby an increasing concentration gradient of said one component on said adsorbent will advance in the direction of flow, discharging gaseous effluent stream from the other end of said zone, under substantially the initial pressure thereof, thereafter stopping the flow of said feed stream, reducing the pressure at said one end to a secondary relatively low pressure and withdrawing a gas stream from said one end, thereby progressively desorbing said one component from said adsorbent and backflowing said desorbed one component toward said one end, whereby a decreasing concentration of said one component on said adsorbent will advance in the direction of backflow, and discharging said one component from said zone at said one end at which said feed stream was introduced, conducting said operation for time periods so that the heats of adsorption and desorption are substantially balanced within said zone, and conducting the fractionation in a manner that substantially the sole transfer of heat to and from the gas in said zone occurs in said bed thereby eliminating the transfer of heat externally with respect to said zone, and conducting the fractionation under conditions whereby an oscillating concentration gradient of said one component will remain in said zone during both the adsorption and desorption cycle, and said gradient will have a front of lowest concentration intermediate the ends of said zone.

36. Process as defined by claim 25 wherein said adsorbent comprises 4 A. molecular sieves.

References Cited in the file of this patent

UNITED STATES PATENTS

| | | |
|---|---|---|
| 2,661,808 | Kahle | Dec. 8, 1953 |
| 2,699,837 | Van Note | Jan. 18, 1955 |
| 2,702,826 | Kirshenbaum et al. | Feb. 22, 1955 |
| 2,747,681 | Schuftan et al. | May 29, 1956 |
| 2,800,197 | Wynkoop | July 23, 1957 |
| 2,815,089 | Turner | Dec. 3, 1957 |

OTHER REFERENCES

"Journal of the American Chemical Society," vol. 78, December 8, 1956, No. 23, pages 5963 to 5971.

Disclaimer 2,944,627.—*Charles W. Skarstrom*, Montvale, N.J. METHOD AND APPARATUS FOR FRACTIONATING GASEOUS MIXTURES BY ADSORPTION. Patent dated July 12, 1960. Disclaimer filed Feb. 24, 1966, by the assignee, *Esso Research and Engineering Company*.

Hereby enters this disclaimer to claims 1, 3, 13, 15 and 23 of said patent.
[*Official Gazette May 31, 1966.*]